Figure 4:
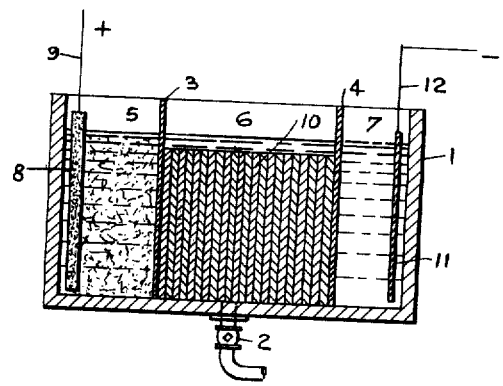

June 29, 1926.
E. TAYLOR ET AL
1,590,596
PRODUCTION OF COLLOIDAL MATERIAL
Filed Oct. 8, 1920   2 Sheets-Sheet 1
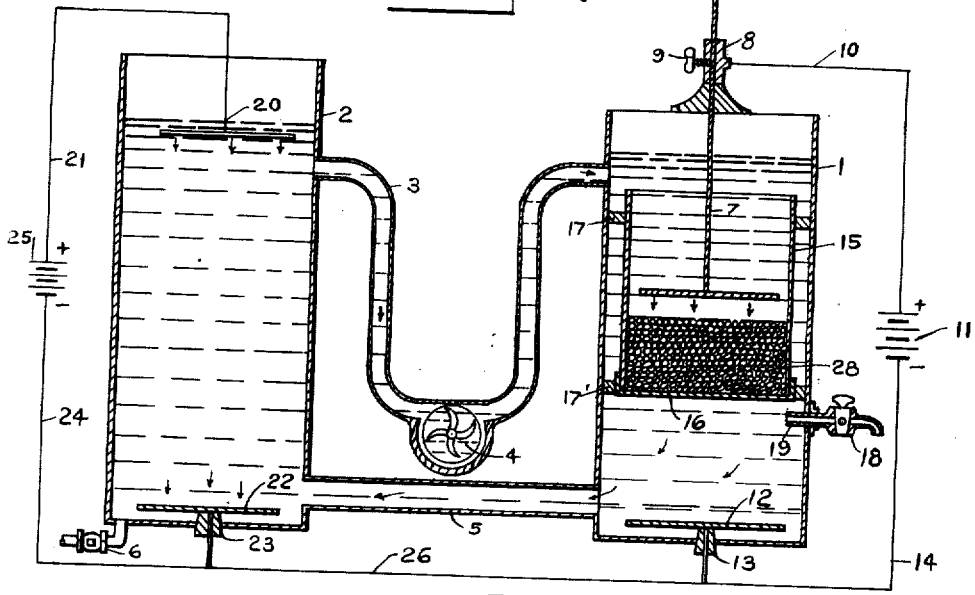
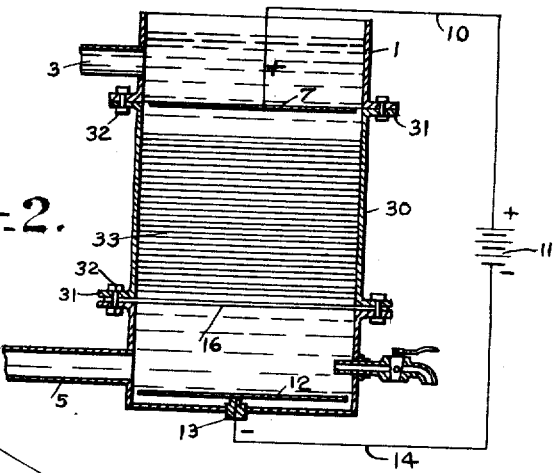
INVENTOR
Edwin Taylor
Edward F. Chandler
Thomas A. Hill.
BY their ATTORNEY June 29, 1926.

E. TAYLOR ET AL 1,590,596

PRODUCTION OF COLLOIDAL MATERIAL

Filed Oct. 8, 1920     2 Sheets-Sheet 2

INVENTOR
Edwin Taylor.
Edward F. Chandler.
Thomas A. Hill.

BY their ATTORNEY

Patented June 29, 1926.

1,590,596

UNITED STATES PATENT OFFICE.

EDWIN TAYLOR AND EDWARD F. CHANDLER, OF BROOKLYN, AND THOMAS A. HILL, OF NEW YORK, N. Y., ASSIGNORS TO TAYLOR LABORATORIES INC., OF NEW YORK, N. Y., A CORPORATION OF NEW YORK.

PRODUCTION OF COLLOIDAL MATERIAL.

Application filed October 8, 1920. Serial No. 415,468.

The invention relates to improvements in the production of colloidal material and more particularly cellulose in non-fibrous and non-cellular form. According to our invention we are able to produce films or other bodies of non-fibrous cellulose which are not only tough, and flexible, but which are either transparent or have various surface and color effects as desired and in a simple and efficient manner.

As an example of a preferred embodiment of our improvements we dissolve suitable cellulosic material in a cupro-ammonia or metal ammonia solution, and then subject a sheet or layer of the cellulose solution to evaporation, thereby causing the mass to thicken and preferably to such an extent that it will substantially retain its shape during handling and we then subject the same to electrolytic action to remove solvent constituents therefrom electrolytically. The sheet or layer or other formed body of the cellulose, which is non-cellular and non-fibrous, may then be washed and dried for use or treated in many different ways to form useful products.

In practicing the invention it is preferable to employ a solution of the utmost concentration and uniform density which may be prepared for example, by dissolving cotton or other organic material of suitable nature in a cupro-ammonium solution. To this solution, for the purpose of still further increasing the dissolved cotton content, the hydrate of some metal other than copper (nickel for example) may be added and subsequently more cotton, resulting ultimately in a highly concentrated solution containing the greatest possible quantity of organic material. By employing a plural metal hydrate solution it will be understood, the quantity of organic material, dissolved will be considerably in excess of that, for a given quantity of the single solution. The solution should be carefully filtered and to insure its uniform density and hydrosol movement it should be repeatedly passed through fine screens or otherwise treated.

The solution is then preferably more or less dried out by treating the same with warm air. This treatment upon being carried to a sufficient extent, we believe transfers the solution from the hydrosol condition to the hydrogel condition and during this transfer we endeavor, according to one form of our improvements, to prevent erratic coalescense or setting up of uneven strains which would disadvantageously affect the resulting product for certain purposes. The evaporation is therefore preferably continued slowly and uniformly.

A convenient method of handling the solution while it is assuming, or preparatory to its assuming the hydrogel state, is to flow the solution on a smooth level surface, governing the thickness of the flowed material in any suitable manner, as for instance by means of a dam, although it would be within the scope of the present application to so flow the solution, as to cause it to assume any definite dimension during the controlled formative period. To insure against disruption of the finished product great care should be exercised in applying or flowing the solution on the surface or support, the desired effect being likened to the unreeling of a sheet of fluid of the desired width and thickness. That is to say, the fluid should be applied in a single, progressive flow from a means adapted to supply the same evenly and uniformly, without ripples or disturbances, either of the surface or mass. If for instance the liquid is applied in narrow widths and allowed to flow together, streaks and irregularities follow as a result of the difference in density, etc., developed during said flowing together. The colloid solution must be poured uniformly and at such a speed and in such manner that a minimum disturbance of the viscous mass results. Care should be taken to avoid unequal density due to unequal exposure, etc. Excessive vibration gives a distinct striation caused by strains set up in nodular lines generally geometric in pattern. Where such a striated or patterned appearance is desired it may be produced in this manner. Heavy shocks cause disruption of the hydrogel and coalescing occurs in spots much akin to the rupture of the strands of a net. Unequal evaporation or other erratic removal of the solution constituents tend to set up drying stresses which result in striations or disruptions of the film produced. It will be understood that what might be termed the ventilation during the evaporation period must be adjusted to the condition it is desired to meet. Air for instance flowing over a long strip of liquid from one side, will naturally effect the exposed surface unequally, also if considerable moisture is present in the air or other fluid, passing over the surface, certain of the fluid constituents to be removed will be left behind entirely or only partially removed, so that for example, the surface of the colloidal solution may be influenced detrimentally by the rapid evaporation say, of ammonia and the precipitation of moisture due to the reduction of surface temperature, etc. Such conditions are liable to cause the material to film over, producing a product of varying densities and generally of uneven surface. Undue variations in temperature must be avoided. Heat causes separation and precipitation of the metallic constituent resulting in a discoloration of the film. In protecting the film against disturbing physical and chemical changes it is deemed important also to exclude direct sunlight. A film blackened during the formation period by heat or other disturbance, results in a spotted, mottled and porous product. However for some purposes such a product may not only be useful but desirable. A low temperature causes freezing and total disruption. Best results have so far been obtained when operating at a temperature of about 80° F.

Preferably the material is dried by dry air from above, gently moving in every direction alternately, as by oscillating currents. This should be continued until the product is formed (hard). At least the treatment should be continued until the product assumes a semi-solid condition so that it may be conveniently handled without materially loosing or changing its shape. The evaporation or formation, when handled on a surface or support, is from the top, protecting the coalescing hydrogel beneath. The initial surfacing or filming over, serves as a protective layer during the continued drying operation or operations, which are continued until the hydrosol activities have stopped, otherwise during subsequent operations this under or interior portion of the film coalesces or precipitates irregularly resulting in a hard surface film having a soft matt finish due to the softer portion diffusing light instead of directly transmitting it. This product is analogous to ground glass and as will be appreciated has many applications in the arts. A peculiarity will be noted in producing this material which tends to differentiate it from other colloidal products in that there is a well defined intermediate stage between the preliminary drying period during the true formation process and the subsequent drying period during the final or finishing process.

The preliminary drying period which will herein often be referred to as the primary drying period embraces the steps from the moment the original solution is flowed or otherwise caused to approximate the dimensions of the desired film or sheet, and while still in the hydrosol condition to the moment when hydrosol activity ceases. Throughout this period there is a gradual though uniform shrinkage until the secondary period sets in and the true hydrogel condition exists, the product then appearing as a translucent film or mass colored according to the metallic constitutents present. If the treatment is stopped at this stage, the said translucent material, if kept wet, will retain its characteristics apparently, indefinitely. To continue the process of production however, this film or mass is subjected to a process of metal removal which is accompanied by a very decided shrinkage of the mass, resulting in a translucent white, tough and elastic material of great commercial importance. It will remain in this condition as long as it is in contact with a body of water. During the secondary drying period the material gradually gives up its moisture, until a hard substantially transparent and clear film remains, resembling in appearance celluloid, etc. From this it will be noted that there is a gradual shrinkage prior to the very pronounced shrinkage which takes place during the metal removal after which the greater shrinkage during the final stage is between the faces in the case of a film.

If the complete drying out is attempted while the film is in contact with the smooth supporting surface, or otherwise held in longitudinal and lateral restraint it will split into curvilinear fragments.

The removal of the metallic content may be accomplished in a variety of ways. A dilute acid (sulphuric, etc.) may be flowed over the surface of the film while on its support and the metal dissolved more or less completely resulting in a film having an acid coagulated surface and is not resoluble in its original solvent. This product is well adapted for use as a permeable membrane, porous base, etc. Preferably however, the film containing the metal, is stripped off and placed between the electrodes of a cell containing an electrolyte which will not coagulate the film, and the metal removed by the action of an electric current. This results in a film that is resoluble in the original solvent and hence is characterized by this important difference from those products which have been acid coagulated. A similar result follows the use of a suitable anode material as the aforesaid smooth supporting surface on which the solution is flowed, the whole being immersed in a suitable electrolyte, in which a cathode is placed. Upon the passage of an electric current, the metal is deposited on the cathode leaving the cellulose associated with the anode, in the white translucent form previously noted.

The film may be originally carried or formed on a metallic support, such as a plate or continuous belt, etc., or on a glass plate having a suitable metallic coating, (silver for instance), adapted to serve as an anode, the setting of the film allowed to proceed under the above condition until the protective film has formed and the activity of the particles beneath it reduced to any desired point. The film carried on its support may now be gently immersed in a suitable electrolyte which may be acid, alkaline or neutral, (preferably ammonium nitrate) and a current passed from the supporting anode through the partially formed film to a suitable cathode whereby the organic material is deposited on the anode layer by layer toward the outer surface, the metallic solution constituent being correspondingly deposited on the cathode, and any remaining volatile solution constituent released by the electrolyte virtually as described in the method of Taylor and Chandler application Ser. No. 314,102 filed July 29, 1919. It has been shown herein that the partially formed film may be striped from its upport while still carrying its metallic constituents. This condition may be taken advantage of, the stripped film being fed through a suitable cell in which the film itself acts as the anode so long as it will pass a current, being continuously fed to keep an active portion of the material under electrolytic influence. The film passing in, for instance, carrying the metallic constituents and passing out, of the cell free or substantially free from metal, etc.

By employing a series of cells all traces of metal may be removed, the subsequent cell or cells, being equipped with both anode and cathode, between which the film, which now, is not so good a conductor, passes and is subjected to electrolytic action, as will be understood. Or, the film may be dried sufficiently to strip from the supporting medium and the metallic content removed by passing the film or plate between electrodes in a suitable acid, alkaline or neutral electrolyte and passing an electric current through both the film and electrolyte thereby removing and recovering the metallic element or elements by continued osmosis and electroylsis as disclosed in the application by Taylor, Ser. No. 364,980 filed Mar. 11, 1920.

The variation of product that may be formed by departing from the above condition are numerous. If the film or plate be thoroughly and rapidly dried on one face, as by oscillating large volumes of warm dry air over the surface, a tough uniform coat may be rapidly formed over the still viscous hydrosol mass beneath. If this material be now immersed in rather strong acid, the osmotic action set up is sufficient to seriously disturb (and disrupt) the coalescing of the colloid particles, which instead of firmly cohering seem to precipitate in a more or less granular form with but slight adherence between the granules. The resulting film after drying is a composite one, characterized by a tough, transparent outer layer with a soft translucent under layer adhering to it, the whole resembling ground glass or in thin films, highly glazed tissue paper. This material is most suitable where diffused light effects are desired as in tracing fabric, transparencies, blue prints, etc.

The films obtained by any of the above methods are characterized by being white and translucent when wet, by great shrinkage through from face to face while drying (generally under tension) and by the fact that their ability to absorb water after this first drying is greatly reduced, the films or plates never swelling again to their original dimensions.

The films after the first drying may be soaked in water for long periods or may be boiled in water without causing perceptible chemical change and without substantially increasing the amount of water absorbed above that taken up initially. The films may be repeatedly wet and dried returning to their dried dimensions each time, unless subject to undue strains while drying. This ability to absorb only so much water and then only when in contact with a volume of it is the so called "solid solution" state. It will be understood that the above observations apply more particularly to highly surfaced transparent films, the transparency of which is merely a light effect and which is obtained by preventing uneven coalescing of the colloid particles. For some products, imitation leathers for instance, opaque materials having definitely varied or "grained" surfaces are more desirable. These effects may be obtained by systematically disrupting the continuity of the colloid solutions during coalescing or "setting." If the colloid be flowed in a rather thick layer over a supporting surface and a thin protection film formed by controlled dry air currents and the colloid mass subjected to mechanical shocks or vibrations, say by rapid tapping on the under surface of the supporting means at a number of equally spaced points, geometric designs or figures may be produced in the body and on the surface of the colloid. These figures are due to different densities of the colloid caused by unequally vibrating the particles while in transition from the hydrosol to the solid state.

Another variation may be made by allowing dry air to flow in one direction across the surface of the colloid solution until a film has formed partly across the surface.

By means of a sudden jar or shock to the supporting member, this film may be disrupted and cause to contract and draw across the surface of the viscous mass beneath. The result of this contraction, which also affects the coalescence of the particles beneath the surface, is to set up a series of more or less parallel waves or ridges of coalesced material interspersed with layers in which the colloid is disrupted and more or less porous. By repeating the above operation at regular intervals, a material may be obtained in sheets as large as required and with a peculiar waved surface and structure, which may now be deprived of its metallic content, and after passing through operations described later will be found to possess many of the properties of well tanned pliable leather.

By flowing the colloid on a support, part of the surface of which has the properties of an anode for instance, a glass plate on which silver or platinum has been deposited in a connected design, uniformly exposing the surface of the colloid to a dry atmosphere until the hydrosol activity has been reduced to a minimum, flooding the surface with any desired electrolyte say a neutral one, and passing an electric current through the colloid from the anode portions of the support to a cathode, the colloid in the path of the current may be deposited on the anode surface after which the viscous colloid may be allowed to coalesce by drying and the metal removed, or the electrolyte may be run off and be replaced by an acid bath whereby the remaining colloid is coagulated and the metallic constituent removed. In the case of a cellulose cupro-ammonia solution, the product obtained by this last method is a composite one, characterized by the fact that the cellulose deposited on the anode surface is resoluble in the original solvent while that coagulated by the acid is not. This process opens a field for still further varying the finished product by partially or entirely dissolving the deposited cellulose before finally finishing the product.

By the use of an anode-cell in place of a metallic anode, various products may be made not obtainable in any other way.

These anode-cells may be also considered as a means for transmitting electrical energy over wide surfaces without the use of expensive unattacked metallic electrodes of platinum, etc.

They consist essentially of a closed box or trough one surface of which is covered with a porous or permeable membrane such as the acid coagulated cellulose described above. In one form, the interior of the box is filled with an electrolyte holding colloidal graphite in suspension, electrical contact being made by an insulated conductor through the side of the box, said conductor terminating in a carbon plate or series of plates. The colloid graphite serves to diffuse the electrical current, while the permeable membrane offers but slight resistance to its passage and at the same time retains even the most finely divided graphite on the principle that one colloid cannot pass through another.

If a colloid solution, say cupro-ammonia-cellulose be brought in contact with the membrane side of one of these cells, and a current passed to a suitable cathode, pure cellulose will be deposited uniformly on the membrane surface. If however, the permeable membrane be rendered impermeable both to liquids and to electric currents, at certain spots say by a coating of paraffine, it is evident that cellulose will be deposited or acted upon by the current only on those portions of the membrane which are still permeable. As the cellulose deposit increases in thickness, its resistance to the current increases the point of lowest resistance shifting to the sides or edges of the deposited material. This causes deposition of cellulose about these edges thereby causing the deposit to become larger in area than and to overlap the permeable spots in the membrane. It is evident that if these spots be spaced not too far apart that the cellulose deposits may be made to ultimately join, the result being a coherent film or sheet of cellulose of any desired thickness, characterized by surface markings corresponding to the impermeable portions of the membrane. If for instance, the permeable membrane while dry is passed over a roll indented to represent a grained leather or this design printed on the permeable membrane with oil, varnish, melted paraffine. etc., it is apparent that on making this printed membrane an anode surface the design may be reproduced in deposited cellulose, silk, etc., with great fidelity. By making a continuous band or belt of this design bearing membrane and using it in conjunction with a drum or other suitable apparatus the above design bearing colloid material may be made continuously.

Grained or design-bearing surfaces may also be preduced by mechanical means by passing any of the films or sheets obtained by the described processes through hot embossing rolls, etc. while the material is damp; but the effect produced is mechanical and lacks the translucent safeness of the above deposited material.

By raising the current density above a certain point the metal containing colloid solutions may be caused to deposit their organic base in a more or less porous condition. This porosity arises from the mechanical disturbance of the hydrogel by the excess current. Advantage may be taken of this for the production of another material, by depositing porous cellulose for instance, on either a plain or a design covered membrane, stripping off the film or sheet, dyeing the same any required color, flowing dissolved colloid material over one or both faces, removing the metallic constituent and drying. The result being a more or less opaque material of any color, covered on one or both faces with a transparent elastic coating and showing a design in relief or otherwise.

Where the colloid base is cellulose, the films or sheets produced by any of the methods may be nitrated, wholly or partly through, by protecting one face (application, E. Taylor Serial No. 364,980 filed Mar. 11, 1920) which face may be plain or bearing a design, this face being later subjected to the action of volatile solvents, whereby a sheet somewhat resembling celluloid, moisture absorbent through part of its thickness and moisture repellent through the remainder of its thickness, is obtained. The absorbent face of these films or sheets may be impregnated with desired materials, photographic salts for instance, such as chloride, bromide, iodide or phosphate of silver, in which case the waterproof backing serves to prevent distortion during developing, washing, etc. This product is particularly suitable for blue prints, etc., and for moving picture films, its rate of combustion being far slower than celluloid on account of the large amount of un-nitrated cellulose present.

The films, plates and sheets, produced by any of the above methods are all easily and cheaply impregnated or sensitized, with silver-salts. The film after its first drying and in its transparent condition is immersed in a solution of say, nitrate of silver. After 15 or 20 min. immersion the film will absorb its maximum amount of silver solution. The solution adhering to the surface is removed, by lightly pressing between, blotting papers for instance, and the film thrown into a solution of any soluble salt capable of producing an insoluble salt by combination with silver, such as the chlorides, bromides, or phosphates of ammonia, potassium or sodium or any mixtures of them, whereby the insoluble silver salt or salts may be directly formed in the substance of the colloid while the latter is in the state of "solid solution."

In some cases, particularly where a combination of silver salts in definite proportions is desired for instance one of bromide, to two of iodide, we prefer to first immerse the films or sheets in a solution containing soluble bromides and iodides in the desired proportions, blotting off or removing the excess, immersing the sheets or film in an excess of say nitrate of silver solution, whereby both the bromide and iodide of silver may be directly formed in the substance of the colloid film. We prefer to use comparatively dilute solutions of silver and of the halogen salts in these operations as with concentrated solutions the deposition of silver iodide, bromide, etc., is so heavy that the action of light is limited to the surface and the removal of unaffected silver salt is extremely slow during fixing, etc. The best results are secured from a comparatively light deposit of silver throughout the colloid mass. After impregnation, the films or sheets are washed in running water, preferably hot, and are then boiled to increase the sensitivity, dried, ironed and are ready for use. The products obtained by these processes are exposed, developed, fixed, etc., by the same methods, chemicals, etc., as are used for gelatine emulsion films but these operations can be much more rapidly conducted with these films as all the solutions may be used at the boiling point which is impossible with gelatine emulsions. It is quite evident that any of the products may serve as a base for coating with gelatine emulsion when this is desirable.

One advantage of these impregnated films is their increased ability to stand rough usage on account of their inherent toughness and the depth to which they may be scratched or marred without perceptible loss of image when projected on a screen, etc.

When impregnated with colloid gold, silver, uranium, etc., films made by the above processes have a wide commercial value as lenses for eye-goggles, plates for optical instruments and for various uses in the arts where materials possessing the peculiar actinic properties of these substances is desirable.

By first rendering portions of the films or sheets impermeable as previously described, the remaining portions may be impregnated with light sensitive salts, or with inert material and many products obtained of great commercial value.

Films or sheets made by the described methods particularly those resoluble in the original solvent may be joined or welded to one another electrolytically as by laying them on an anode-cell with the edges slightly separated and protecting the other exposed surfaces by coating with paraffine, etc.

A solution of the same organic base as the sheets to be joined, cellulose, silk, etc., is now carefully flowed between and over the edges, for convenience assume cellulose sheets and a cuproammonia-cellulose solution. The cellulose solution should be an unsaturated one in order that the excess cupro-ammonia may attack and "gelatinate" the cellulose edges converting them to the hydrogel state in a few minutes. The cellulose solution is now exposed to oscillating air currents until the exposed surface assumes the hydrogel state when a neutral electrolyte say ammonium nitrate is flowed over the sheets and joint and a current passed through to a suitable cathode whereby cellulose is deposited between the sheets and the dissolved or gelatinated cellulose of the sheet edges is redeposited in situ. The current is continued until a sufficient cellulose deposit between sheets is obtained after which the sheets are dried preferably under tension and any excess cellulose removed by "skiving" and buffing. When proper care has been exercised the joint is indistinguishable from the rest of the sheet.

With acid-coagulated cellulose, the best method is to pour concentrated cellulose solution between the edges and dry almost completely by oscillating air currents, after which the metallic solution element may be removed by acid solution or by electrolysis. Owing to the fact that the material in this case is insoluble, the joint while good, lacks the homogeneity of the previous case and breaks under less strain than the rest of the sheet. This welding process is important as it permits of joining sheets or pieces of similar material to form endless belts or continuous strips and it is also of use in joining dissimilar materials into various designs, fabrics, etc.

All of the materials, produced by above methods may be rendered impervious to water particularly when in the state of solid solution, by impregnating them with insoluble soaps such as the oleates, stearates, plalmitates, etc. of lime, alumina, lead, etc. They may be nitrated after forming, without changing their shapes, washed neutralized and finally treated with volatile solvents, thereby converting them to celluloid-like products having the same general contour and dimensions of the original products or they may be treated with formaldehyde.

All of the above products have wide and useful commercial applications. While some of them are fireproof they are all slow burning with the exception of those which have been nitrated after forming and the resistance of the others to heat or fire may be greatly increased by impregnating them with well known "fire-proofing" solutions such as alum, tungstate of soda and the like.

The cellulose produced by electro-deposition on suitable anodes from metallic solutions possesses the same chemical composition as did the organic portion of the original fibrous cellulose. It is characterized by being more freely soluble in the same solutions than fibrous or cellular cellulose, the so-called celluloses and viscoses produced by precipitation by acids, etc., being insoluble in these solutions. Being amorphous in structure it is more readily acted upon by reagents, nitric acid, for instance. There is no ash after incineration, whereas the ash from any of the natural or fibrous celluloses, lignoses, etc. is quite heavy. After the secondary osmotic and electrolytic treatment described above not even the slightest trace of metallic content can be detected. The final product is pure cellulose in an amorphous condition and as such is entirely new in the arts.

In the Taylor-Chandler process, U. S. Patent Office Serial No. 314,102 filed July 29/19 cellulose or other organic material is electro-deposited on suitable anodes by passing an electric current through metallic solutions of cellulose, etc., the metallic content of the solutions being simultaneously deposited on the cathodes.

If the current passed is correctly controlled, the deposited organic material will be entirely free from metallic solution constituents, copper, nickel, zinc, etc., but if heavy currents are passed or if the deposited material be lifted from the cellulose solution, decided amounts of the metals employed may be entrapped in the material or may adhere to the outside from which it is not easily removed by washing.

One object of the present method is to entirely remove all traces of metallic elements from the deposited organic material by submitting the same to a treatment combining both osmosis and true electrolytic action.

Broadly speaking the method consists in tightly packing the metal-containing material into vessels filled with a suitable electrolyte, passing an electric current through both electrolyte and cellulose, and causing the electrolyte to circulate through the cellulose and the metallic content to be removed from the cellulose and deposited on suitable electrodes.

Figure 5:
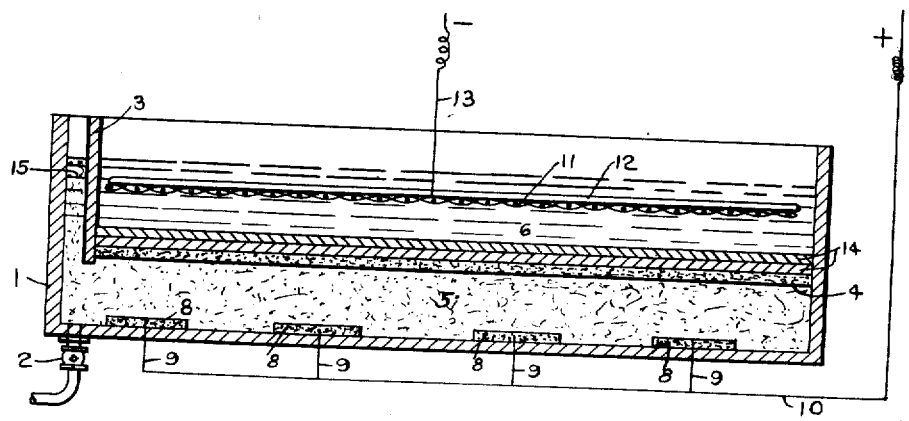

In the accompanying drawings Fig. 1 is a vertical section, largely diagrammatical, illustrating an apparatus for carrying out our improvements in one form. Fig. 2 is a similar section through the main tank illustrating a modification. Fig. 3 is a perspective view of a film being lifted from a drying slab. Figs. 4 and 5 are vertical sections through electrolytic cells illustrating further modifications.

Referring to Fig. 1, the apparatus consists of two vessels or tanks, 1, 2, of any desired cross-section and constructed of non-conducting material such as paraffined wood, vulcanite, etc. A bent tube 3, also of non-conducting material and of a predetermined length serves to connect tanks 1 and 2 at their upper portions. Tube 3 may be provided at any desired point with a propeller or pump 4, for the mechanical circulation of liquid in 3. Tanks 1 and 2 are again connected at or near the bottom by a straight tube 5, of non-conducting material. An outlet cock 6, serves to drain both tanks and tube 5, when desired.

An adjustable anode 7, extends downwardly into tank 1, being held in position by a bracket 8, fitted with a clamping screw 9. Current is supplied to 7, by a conducting lead 10, from a suitable source of electrical energy 11. A cathode 12, provided with an insulating plug 13, is fitted at the bottom of tank 1, and is connected to electric energy source 11, by means of a lead 14. An inner removable vessel 15, of non-conducting material provided with a porous bottom or diaphragm 16, preferably of felt is fitted with one or more soft rubber gaskets 17, 17' which serve to hold it in position and more particularly serve to prevent any leakage of current from anode 7, to cathode 12, through the clearance space between the walls of vessel 15, and tank 1. A cock 18, is set in the wall of tank 1. This cock is provided with an extension 19, projecting well under the diaphragm, 16, by means of which samples may be drawn at will from the liquid below 16.

Tank 2, is provided near it supper part with an anode 20, connected by means of lead 21, with a second source of electric energy 25. A cathode 22, with an insulating plug 23, is placed at the bottom of tank 2 and connected by lead 24, to the source of energy 25. By means of a lead 26, cathode 22, may be made common to both anodes 20 and 7, thereby subjecting liquid in tube 5 to electrolysis during its cyclic passage through both tanks.

The operation of the process is as follows: Tanks 1, and 2, and the connecting tubes 3, and 5, are filled with a suitable electrolyte such as dilute sulphuric or nitric acid, or the solution may be alkaline with dilute ammonia, or it may be neutral. We prefer dilute ammonium nitrate.

The vessel 15, is tightly packed with the bodies of dissolved organic material to be treated, the material being kept saturated with the desired electrolyte during packing. The material may be in any form, filaments, ribbons, cords, tubes, etc. the main point being a regularity in packing so that the electrical resistance shall be practically the same throughout the mass. This material may be electro-deposited organic matter. The vessel with its contents indicated by 28, is now forced into tank 1, until its contents are well below the level of the liquid in the tank. The anode 7, made of such size and shape that its face practically covers the mass 28, is now pushed down in vessel 15, until it comes in contact with the mass or is slightly above it, the pump 4 set in operation to circulate the conducting liquid in a cyclic path through the cells 1 and 2 in the direction indicated by the arrows, passing through the cell 1 in the general direction from anode to cathode 12. The current is obliged to travel through the mass 28, say of cellulose containing metallic elements, copper, nickel, etc., in spite of the somewhat high electrical resistance to the same, being prevented from taking any other path by the tightly fitted gaskets 17, 17'.

True electrolysis of the contained metal, copper for instance, takes place, the liquid below diaphragm 16, becoming more or less saturated with it and its density is thereby increased. Most of the copper or the like is gradually electro-deposited on the cathode 12. The cellulose mass being a permeable membrane, with a liquid of different density on each side, osmotic action at once takes place and a slow circulation of the electrolyte takes place through both tanks and connecting tubes in a direction shown by the arrows in the tubes. This circulation is aided by the passage of a second current through the liquid in tank 2, from anode 20, to cathode 22, the gas evolved tending to raise the level of the liquid in this tank above that in tank 1. This second current is provided to insure the complete removal of any trace of metallic content from the electrolyte and deposition thereof on the cathode 22 before the electrolyte returns to tank 1.

Under the combined electrolysis and the osmotic circulation through the cellulose wall or mass, the metallic content is thoroughly removed in a minimum time and is deposited on the cathodes 12, 22, in a condition to be readily removed and again used. When the electrolyte below diaphragm 16, is entirely metal-free as determined by samples taken from cock 18, the vessel 15 is removed from tank 1, and a similar one packed as before, inserted. In this way, the process becomes practically continuous. The material is taken from vessel 15, washed and dried and is ready for further operations.

Fig. 2 shows a modification of the apparatus, wherein a section of tank 1 is made removable by means of flanges 31, 31 and quick acting bolts 32, 32. This modification is intended more particularly for large sheets etc. 33, which are cut to pack snugly into the section, which is preferably square or rectangular, the section being removed as soon as its charge is demetallized and replaced with a freshly charged one. In all other respects the apparatus and process is the same as in Fig. 1, and all part numbers refer to the same parts in each.

Fig. 4 shows a modification of the method. In this case a tank 1 of non-conducting material, rubber, glass, water-proofed cellulose, etc. having an outlet cock 2, is tightly fitted at suitable distances from its ends, with two transverse partitions or diaphragms 3, and 4, of porous material such as felt or of permeable membrane such as coagulated or electro-deposited cellulose, thereby dividing tank 1, into three compartments 5, 6, 7. These compartments are filled with a common electrolyte which as before may be acid, alkaline or neutral. Compartment 5 is provided near its end wall with an electrode plate or anode 8, preferably of carbon to which is attached a conductor 9. The electrolyte in compartment 5 contains a considerable amount of colloidal graphite in suspension, its object being to diffuse the electric current during the passage of same from anode 8. The diaphragm 3 is placed as far as practicable from the anode in order to aid this diffusion and insure a practically uniform current density through the diaphragm 3. The colloid graphite owing to its nature is unable to pass through the diaphragm which also retains any carbon thrown from the carbon anode during the passage of current. Compartment 6 is filled with the material from which metallic constituents are to be removed say plates of cellulose 10. Compartment 7 contains a metallic plate 11, preferably of the same nature as the metal to be removed from the organic material. This plate serves as a cathode during operation by means of the conductor 12. It is evident that a wire screen may be employed instead of a solid plate for this cathode, though it should cover substantially the cross-sectional area of the cell. It is also evident that colloidal graphite may be employed in compartment 7, to aid in securing a uniform current density through the organic material 10, whereby the complete removal of metallic solution material from the same and its deposition on cathode 11, is assured.

Fig. 5 shows an electrolytic cell particularly adapted for the removal of metal from large sheets of cellulose at a minimum cost for electrodes and apparatus generally. A rather shallow, rectangular tank 1, of non-conducting material is provided with an outlet-cock 2, and a transverse partition wall 3, extending from the top edge downwardly toward the bottom. A felt diaphragm, or preferably a cellulose membrane is stretched from the lower edge of this parallel to the bottom, dividing the tank 1, into a lower compartment 5, and an upper compartment 6. In the lower compartment 5, and on the bottom of tank 1, are placed a series of carbon plates 8, 8, joined by conductors 9, 9, to a common lead 10.

Compartment 5 is filled up to the diaphragm 4, with any desired electrolyte containing colloidal graphite in suspension. Compartment 6 is filled to any desired point with an electrolyte which may be similar to the electrolyte in compartment 5 but lacking the suspended colloid graphite. A removable cathode 11, of suitable wire-screen, carried on a frame 12, and fitted with conducting means 13, is immersed in the electrolyte in compartment 6, parallel to the surface of the diaphragm 4. The sheets of material to be treated 14, 14, are placed on the surface of the diaphragm and should be of such size that they fill compartment 6, from wall to wall. On passing a current from the anode connection 10, through the cell the sheets 14, 14 are in a uniform field and any metallic content may be thoroughly removed and deposited on the cathode 11. Any gas liberated from the carbon plates 8, 8 is free to pass to the atmosphere through the vent space 15 between the end wall of the tank 1, and its transverse partition 8.

We are thus able to secure a uniform current flow through each square inch of cross-section the electrodes being substantially equal in area to the area of the mass of organic material.

It is evident that with slight modification of apparatus employed the method may be applied to a continuous moving band of material, and other modifications may be made and the improvements embodied in widely different forms without departing from the spirit and scope thereof in their broader aspects; hence we desire to cover all forms and modifications coming within the language or scope of any one or more of the appended claims.

What we claim as new and desire to secure by Letters Patent, is:—

1. The process of making films, which consists in dissolving fibrous or cellular organic matter in a solvent composed of gaseous and metallic constituents, removing the gaseous constituents to form the film, and then submitting the film so formed to an electrolytic treatment to remove said metallic constituents.

2. The method of producing cellulose in sheets which consists in flowing the solvent containing the cellulose in solution over a given area approximating the size of the sheet desired, subjecting the said flowed solvent to evaporation to increase its viscosity thereby providing a relatively tough sheet, and then placing the sheet between the poles of an electrolytic cell for the separation of the pure cellulose from the remaining constituents of the said solvent.

3. The method of producing films or sheets of cellulose from a cupro-ammonium solution containing dissolved cellular or fibrous organic material, which consists in flowing the solution so as to expose a relatively wide surface area, withdrawing the volatile constituents of the solution thereby increasing its viscosity and causing it to retain substantially the said surface area, placing the toughened or viscous sheet or film between the poles of an electrolytic cell, whereby the passage of a current through the porous sheet removes the non-volatile constituents still associated with the cellulose, and then drying said sheet or film to decrease its porosity.

4. The method of removing the copper from a cupro-ammonium solution of cellulose, which consists in flowing the solution over an area so as to expose a relatively wide surface, evaporating from said surface sufficient of the volatile constituents of the solution to render the mass highly viscous, placing said mass between the electrodes of an electrolytic cell for the deposition of the copper, and then drying the mass.

5. The method of treating cellulosic material which consists in dissolving cellulosic material in a metal-compound solution solvent thereof, subjecting the cellulose solution to evaporation to increase the viscosity thereof and passing an electrolytic current through the viscous cellulose solution to remove solvent constituents therefrom.

6. The method of treating cellulosic material which consists in dissolving cellulosic material in a solvent solution thereof, subjecting the cellulose solution to evaporation to produce a body of substantially definite shape therefrom, and subjecting said body to electrolysis in an electrolytic cell to remove solvent constituents therefrom electrolytically.

7. The method of treating cellulosic material which consists in dissolving cellulosic material in a solvent solution thereof, subjecting said solution to evaporation to increase the stiffness thereof, placing the cellulose solution in an electrolytic cell between the anode and cathode thereof, with a permeable separator between the cellulose solution and the cathode and causing a current to pass between said electrodes whereby solvent constituents are removed from the cellulose electrolytically.

8. The method of treating cellulose material which consists in dissolving cellulosic material in a solvent solution thereof, subjecting said solution to evaporation to increase the stiffness thereof, placing the cellulose solution in an electrolytic cell between the anode and cathode thereof, circulating a conducting liquid through the cell and during such circulation causing a current to pass between said electrodes whereby solvent constituents are removed from the cellulose electrolytically.

9. The method of treating cellulose material which consists in dissolving cellulosic material in a solvent solution thereof, subjecting said solution to evaporation to increase the stiffness thereof, placing the cellulose solution in an electrolytic cell between the anode and cathode thereof, circulating a conducting liquid through the cell and during such circulation causing a current to pass between said electrodes whereby solvent constituents are removed from the cellulose electrolytically, said conducting liquid circulating in cyclic path extending outside the cell, and subjecting said liquid to electrolytic current in a portion of said path outside said cell.

10. The method of treating cellulose which consists in dissolving the cellulosic material in a metal compound solution solvent thereof, and subjecting the cellulose solution to the action of an electrolytic current between electrodes in an electrolytic cell while circulating a conducting liquid through the cell in a cyclic path to remove solvent metal from the cellulose and cause it to be deposited on one of the electrodes, and subjecting the conducting liquid to electrolysis between electrodes in another part of the cyclic path to remove remaining solvent metal therefrom before it returns to the said cell.

11. The method of treating cellulose which consists in dissolving the cellulosic material in a metal compound solution solvent thereof, and subjecting the cellulose solution to the action of an electrolytic current between electrodes in an electrolytic cell while circulating a conducting liquid through the cell in a cyclic path to remove solvent metal from the cellulose and cause it to be deposited on one of the electrodes, and subjecting the conducting liquid to electrolysis between electrodes in another part of the cyclic path to remove remaining solvent metal therefrom before it returns to the said cell, the cellulose solution being separated from the anode of said cell by a permeable separator.

12. The method of treating cellulose which consists in dissolving the cellulosic material in a metal compound solution solvent thereof, and subjecting the cellulose solution to the action of an electrolytic current between electrodes in an electrolytic cell while circulating a conducting liquid through the cell in a cyclic path to remove solvent metal from the cellulose and cause it to be deposited on one of the electrodes, and subjecting the conducting liquid to electrolysis between electrodes in another part of the cyclic path to remove remaining solvent metal therefrom before it returns to the said cell, the cellulose solution being separated from the anode of said cell by a permeable separator, and the conducting liquid travelling through the cell in the general direction from cathode to anode.

13. Arrangement of the class described having in combination means for causing a conducting liquid to travel in a cyclic path, an electrolytic cell in one portion of the path, an anode and cathode therein, material between said electrodes to be electrolyzed, another electrolytic cell in said cyclic path, and electrodes therein to subject said liquid to electrolysis as it passes through said second cell.

14. The method of treating cellulosic material which consists in dissolving cellulosic material in a solvent solution thereof, subjecting a sheet or layer of the cellulose solution to evaporation to increase the stiffness thereof, subjecting the sheet or layer to shock or jar after partial evaporation and then subjecting it to electrolytic action.

15. The method of treating cellulosic material which consists in dissolving cellulosic material in a metal compound solvent solution thereof, subjecting a sheet or layer of the cellulose solution to evaporation to increase the stiffness thereof, subjecting the sheet or layer to shock or jar after partial evaporation to produce a graining effect in the sheet or layer and subjecting the same to electrolysis.

16. The method of treating cellulosic material which consists in dissolving cellulosic material in a solvent solution thereof, subjecting a sheet or layer of the cellulose solution to evaporation to increase the stiffness thereof, subjecting the sheet or layer to shock or jar after partial evaporation to produce a graining effect in the sheet or layer and treating it electrolytically.

17. The method of treating cellulosic material which consists in dissolving cellulosic material in a metal conpound solvent solution thereof, subjecting a sheet or layer of cellulose solution to evaporation to increase the stiffness thereof, and subjecting the sheet or layer to shock or jar after partial evaporation to produce a graining effect in the sheet or layer, and passing an electrolytic current through the sheet or layer whereby the solvent metal is removed therefrom electrolytically.

18. The method of treating cellulosic material which consists in dissolving cellulosic material in a solvent thereof containing plural metal compounds and then removing solvent constituents from the cellulose.

19. The method of treating cellulosic material which consists in dissolving cellulosic material in a solvent thereof containing plural metal compounds and subjecting the cellulose solution to electrolytic action to remove solvent constituents therefrom electrolytically.

20. The method of forming cellulose bodies which consists in applying a solution of cellulosic material to an anode surface having a predetermined design thereon and subjecting the solution to electrolysis to remove solvent constituents therefrom.

In testimony whereof we hereunto affix our signatures.

EDWIN TAYLOR.
EDWARD F. CHANDLER.
THOMAS A. HILL.

material which consists in dissolving cellulosic material in a solvent solution thereof, subjecting a sheet or layer of the cellulose solution to evaporation to increase the stiffness thereof, subjecting the sheet or layer to shock or jar after partial evaporation and then subjecting it to electrolytic action.

15. The method of treating cellulosic material which consists in dissolving cellulosic material in a metal compound solvent solution thereof, subjecting a sheet or layer of the cellulose solution to evaporation to increase the stiffness thereof, subjecting the sheet or layer to shock or jar after partial evaporation to produce a graining effect in the sheet or layer and subjecting the same to electrolysis.

16. The method of treating cellulosic material which consists in dissolving cellulosic material in a solvent solution thereof, subjecting a sheet or layer of the cellulose solution to evaporation to increase the stiffness thereof, subjecting the sheet or layer to shock or jar after partial evaporation to produce a graining effect in the sheet or layer and treating it electrolytically.

17. The method of treating cellulosic material which consists in dissolving cellulosic material in a metal conpound solvent solution thereof, subjecting a sheet or layer of cellulose solution to evaporation to increase the stiffness thereof, and subjecting the sheet or layer to shock or jar after partial evaporation to produce a graining effect in the sheet or layer, and passing an electrolytic current through the sheet or layer whereby the solvent metal is removed therefrom electrolytically.

18. The method of treating cellulosic material which consists in dissolving cellulosic material in a solvent thereof containing plural metal compounds and then removing solvent constituents from the cellulose.

19. The method of treating cellulosic material which consists in dissolving cellulosic material in a solvent thereof containing plural metal compounds and subjecting the cellulose solution to electrolytic action to remove solvent constituents therefrom electrolytically.

20. The method of forming cellulose bodies which consists in applying a solution of cellulosic material to an anode surface having a predetermined design thereon and subjecting the solution to electrolysis to remove solvent constituents therefrom.

In testimony whereof we hereunto affix our signatures.

EDWIN TAYLOR.
EDWARD F. CHANDLER.
THOMAS A. HILL.

CERTIFICATE OF CORRECTION.

Patent No. 1,590,596,                    granted June 29, 1926.

to EDWIN TAYLOR ET AL.

It is hereby certified that error appears in the printed specification of the above mentioned patent requiring correction as follows: Page 3, line 26, for the misspelled word "upport" read "support"; page 4, line 116, for "preduced" read "produced"; page 5, line 99, for "mide" read "wide"; and that the said Letters Patent should be read with these corrections therein that the same may conform to the record of the case in the Patent Office.

Signed and sealed this 8th day of March, A. D. 1927.

Seal.                                                            M. J. Moore,
                                                                      Acting Commissioner of Patents.

CERTIFICATE OF CORRECTION.

Patent No. 1,590,596.    granted June 29, 1926.

to EDWIN TAYLOR ET AL.

It is hereby certified that error appears in the printed specification of the above mentioned patent requiring correction as follows: Page 3, line 26, for the misspelled word "upport" read "support"; page 4, line 116, for "preduced" read "produced"; page 5, line 99, for "mide" read "wide"; and that the said Letters Patent should be read with these corrections therein that the same may conform to the record of the case in the Patent Office.

Signed and sealed this 8th day of March, A. D. 1927.

Seal.

M. J. Moore,
Acting Commissioner of Patents.